(12) United States Patent
Mukherjee

(10) Patent No.: US 7,757,233 B2
(45) Date of Patent: Jul. 13, 2010

(54) CONTROLLING A COMPUTER SYSTEM HAVING A PROCESSOR INCLUDING A PLURALITY OF CORES

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 12/170,628

(22) Filed: Jul. 10, 2008

(65) Prior Publication Data

US 2010/0011363 A1      Jan. 14, 2010

(51) Int. Cl.
  G06F 9/46   (2006.01)
  G06F 1/00   (2006.01)
  G01K 1/08   (2006.01)
(52) U.S. Cl. .................. 718/100; 718/103; 718/105; 713/300; 713/323; 702/132
(58) Field of Classification Search ............. 718/102, 718/103, 105; 713/300, 323; 702/132
  See application file for complete search history.

(56) References Cited

U.S. PATENT DOCUMENTS

| | | | |
|---|---|---|---|
| 5,506,987 A * | 4/1996 | Abramson et al. ........... | 718/103 |
| 5,870,614 A | 2/1999 | Ang | |
| 6,804,632 B2 | 10/2004 | Orenstien et al. | |
| 6,834,353 B2 | 12/2004 | Smith et al. | |
| 7,263,457 B2 * | 8/2007 | White et al. ................ | 702/132 |
| 7,552,346 B2 * | 6/2009 | Aguilar et al. .............. | 713/300 |
| 2002/0065049 A1 | 5/2002 | Chauvel et al. | |
| 2003/0115495 A1 * | 6/2003 | Rawson, III ................. | 713/324 |
| 2003/0217297 A1 | 11/2003 | Gschwind et al. | |
| 2003/0229662 A1 * | 12/2003 | Luick ........................ | 709/106 |
| 2004/0128663 A1 * | 7/2004 | Rotem ........................ | 717/161 |
| 2005/0050310 A1 * | 3/2005 | Bailey et al. .................. | 713/1 |
| 2005/0216222 A1 * | 9/2005 | Inoue ......................... | 702/136 |
| 2005/0216775 A1 * | 9/2005 | Inoue ......................... | 713/300 |
| 2005/0246558 A1 * | 11/2005 | Ku ............................ | 713/300 |
| 2005/0278520 A1 * | 12/2005 | Hirai et al. .................... | 713/1 |

(Continued)

FOREIGN PATENT DOCUMENTS

JP   2006-133995   5/2006

(Continued)

OTHER PUBLICATIONS

Ioannou et al, "Thermal Aware Multi-Core Scheduler", Univerity of Cyprus, Cyprus, 2007, pp. 1-4.*

(Continued)

*Primary Examiner*—Thomas Lee
*Assistant Examiner*—Jennifer N To
(74) *Attorney, Agent, or Firm*—Steven Capella; Shimokaji & Associates, P.C.

(57) ABSTRACT

Controlling a computer system having at least one processor including a plurality of cores includes establishing a core max value that sets a maximum number of the plurality of cores operating at a predetermined time period based on an operating condition, determining a core run value that is associated with a number of the plurality of cores of the at least one processor operating at the predetermined time period, and stopping at least one of the plurality of cores in the event the core run value exceeds the core max value at the predetermined time period.

17 Claims, 2 Drawing Sheets

U.S. PATENT DOCUMENTS

| | | |
|---|---|---|
| 2006/0070073 A1* | 3/2006 | Maeda et al. ............... 718/100 |
| 2006/0117200 A1* | 6/2006 | Bailey et al. ................ 713/323 |
| 2006/0123264 A1* | 6/2006 | Bailey et al. ................ 713/323 |
| 2006/0123422 A1 | 6/2006 | Felter et al. |
| 2006/0149975 A1 | 7/2006 | Rotem et al. |
| 2006/0156041 A1* | 7/2006 | Zaretsky et al. ............ 713/300 |
| 2006/0218423 A1 | 9/2006 | Diefenbaugh et al. |
| 2006/0288243 A1* | 12/2006 | Kim ........................... 713/300 |
| 2007/0106428 A1* | 5/2007 | Omizo et al. ............... 700/300 |
| 2007/0121492 A1 | 5/2007 | Johns et al. |
| 2007/0198134 A1* | 8/2007 | Adachi et al. .............. 700/300 |
| 2007/0260895 A1* | 11/2007 | Aguilar et al. .............. 713/300 |
| 2008/0005591 A1* | 1/2008 | Trautman et al. ........... 713/300 |
| 2008/0140896 A1* | 6/2008 | Todoroki et al. ............ 710/264 |
| 2009/0055826 A1* | 2/2009 | Bernstein et al. ............ 718/102 |
| 2009/0089792 A1* | 4/2009 | Johnson et al. ............. 718/105 |
| 2009/0222654 A1* | 9/2009 | Hum et al. .................. 713/100 |

FOREIGN PATENT DOCUMENTS

| | | |
|---|---|---|
| JP | 2007-241376 | 9/2007 |
| JP | 2008-004094 | 1/2008 |
| JP | 2008004094 | 1/2008 |
| JP | 2008-097280 | 4/2008 |
| JP | 2008097280 | 4/2008 |
| WO | WO 2005/010737 | 2/2005 |
| WO | WO2005010737 | 2/2005 |

OTHER PUBLICATIONS

Constantinou et al, "Performance Implications of Single Thread Migration on a Chip Multi-Core", ACM SIGARCH, vol. 33, No. 4, Sep. 2005, pp. 80-91.*
Written Opinion and Search Report EP 08 16 7739.
Japanese Office Action dated Aug. 26, 2009.
Japanese Office Action dated Apr. 22, 2010.

* cited by examiner

CONTROLLING A COMPUTER SYSTEM HAVING A PROCESSOR INCLUDING A PLURALITY OF CORES

BACKGROUND

This invention relates to the art of computer systems and, more particularly, to a method of controlling a computer system having a processor including a plurality of cores.

Computer systems are growing more complex, capable of performing more and more tasks while, at the same time, decreasing in size. Processor clock speeds continue to increase in order to rapidly handle processor intensive applications such as streaming video, gamming, as well handling complex spreadsheets, computations and the like. Many computer systems are utilizing multiple processors in order to accommodate the processor intensive applications. In addition to employing multiple processors, currently there exist processors having two cores that provide increased speed and processing bandwidth. As processors grow in speed and complexity, heat becomes an issue.

Currently, heat dissipation is addressed on a macro level. That is, fans and heat sinks are provided to dissipate heat from the processors. When heat is still a problem, system shut downs are instituted. That is, in the case of large, multi-computer systems, one or more systems are shut down until temperature levels decrease. In the case of multi-processor systems, one or more processors are stopped until temperature levels drop below maximum allowable limits. Once the temperature levels return within allowable limits, the systems/processors are re-initiated. While effective at reducing heat, both solutions represent a significant loss of computing resources.

SUMMARY

Exemplary embodiments of the invention include controlling a computer system having at least one processor including a plurality of cores by establishing a core max value that sets a maximum number of the plurality of cores operating at a predetermined time period based on an operating condition, determining a core run value that is associated with a number of the plurality of cores of the at least one processor operating at the predetermined time period, and stopping at least one of the plurality of cores in the event the core run value exceeds the core max value at the predetermined time period.

System and computer program products corresponding to the above-summarized methods are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION

Figure 1:
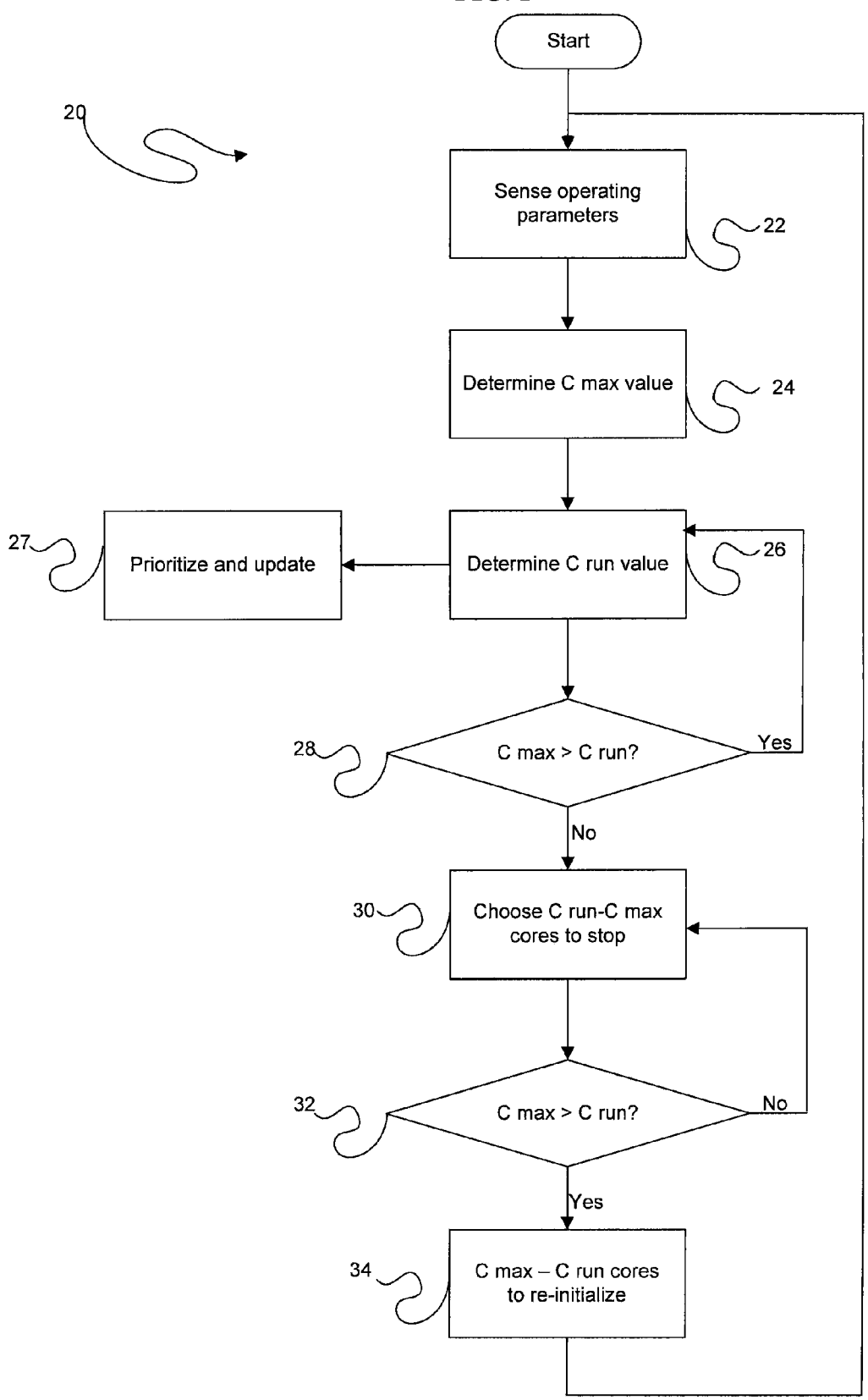
FIG. 1 is a flow chart illustrating an a method of controlling a processor having a plurality of cores in accordance with an exemplary embodiment of the invention.

With initial reference to FIG. 1, a method of controlling a computer system having a central processor provided with a plurality of cores is indicated generally at 20. Initially, operating parameters for a processor are sensed as indicated in block 22. More specifically, a determination is made as to various operating parameters such as, but not limited to, power supply capacity, air conditioner capacity, processing load, and/or ambient temperature. Based on one or more of the operating parameters, a C_max value or the number of processor cores that should run at the same time, is determined as indicated in block 24. After determining the C_max value, a determination is made regarding the number of cores actually currently running to set a C_run value as indicated in block 26. While scanning the processor for the number of cores running, all active jobs are prioritized as indicated in block 27. Priority is based on a variety of parameters such as, but not limited to, critically of problem solving. For example, jobs requiring an immediate answer will have priority of jobs that involve long term research. Priority can be set by a system administrator or by each user. In any event the priority of the active jobs is updated periodically in order to maintain a current priority list. At this point, the C_run value is compared to the C_max value as indicated in block 28. If the C_run value is less than the C_max value no action is taken, and the C_run value is continuously updated and compared to the C_max value. If, however, the C_run value exceeds the C_max value, cores must be stopped and a determination is made regarding the number of cores that require stopping to return the C_run value to a level below the C_max value as indicated in block 30.

The number of cores that must be stopped should be equal to or greater than the number of cores required to lower the C_run value to a point below the C_max value. Core stoppage is based on job priority as determined in block 27. Cores having a low priority are stopped before cores having a higher priority. Once the cores that will be stopped are identified, stop values are assigned to associated core assignment tables. For each core to be stopped, once a job is completed, or a stopping point is reached, the core is stopped and instructed not to take on additional jobs without further instructions. More specifically, upon receipt of a stop value, the core copies a call stack, paging status, memory access and other job information to memory and assumes a sleep mode. At this point, a determination is made whether the C_run value is less than the C_max value as indicated in block 32. If not, additional cores are stopped. If, on the other hand, the C_run value is falls to a level at or below the C_max value cores previously stopped are re-initialized and enabled to take on additional jobs as indicated in block 34.

More specifically, once the C_run value falls to a level that is at or below the C_max value a determination is made of how many cores can be brought out of the sleep mode. The particular ones of the cores brought out of the sleep mode may depend upon assigned job priorities, e.g. cores necessary to process particular processing jobs. Once the cores that will be re-initialized are identified, wake values are assigned to the cores assignment tables. Upon receipt of the wake values, the cores copy the call stack, paging status, memory access and other job information from memory and resume the job already in process or are now available to take on new jobs.

At this point, it should be appreciated that exemplary embodiments of the invention, while described in connection with a single processor, can also be utilized with multiple processors having multiple cores, as well as servers having multiple processors each having multiple cores. In this manner, exemplary embodiments of the invention manage processor load during periods of duress, e.g., high temperature, high usage, and the like. During periods of high duress the system stops or shuts down particular ones of the cores as necessary in order to maintain the processor at sustainable levels during the periods of duress for longer periods of time in order to prevent power supply outages or climate control equipment breakdown.

Figure 2:
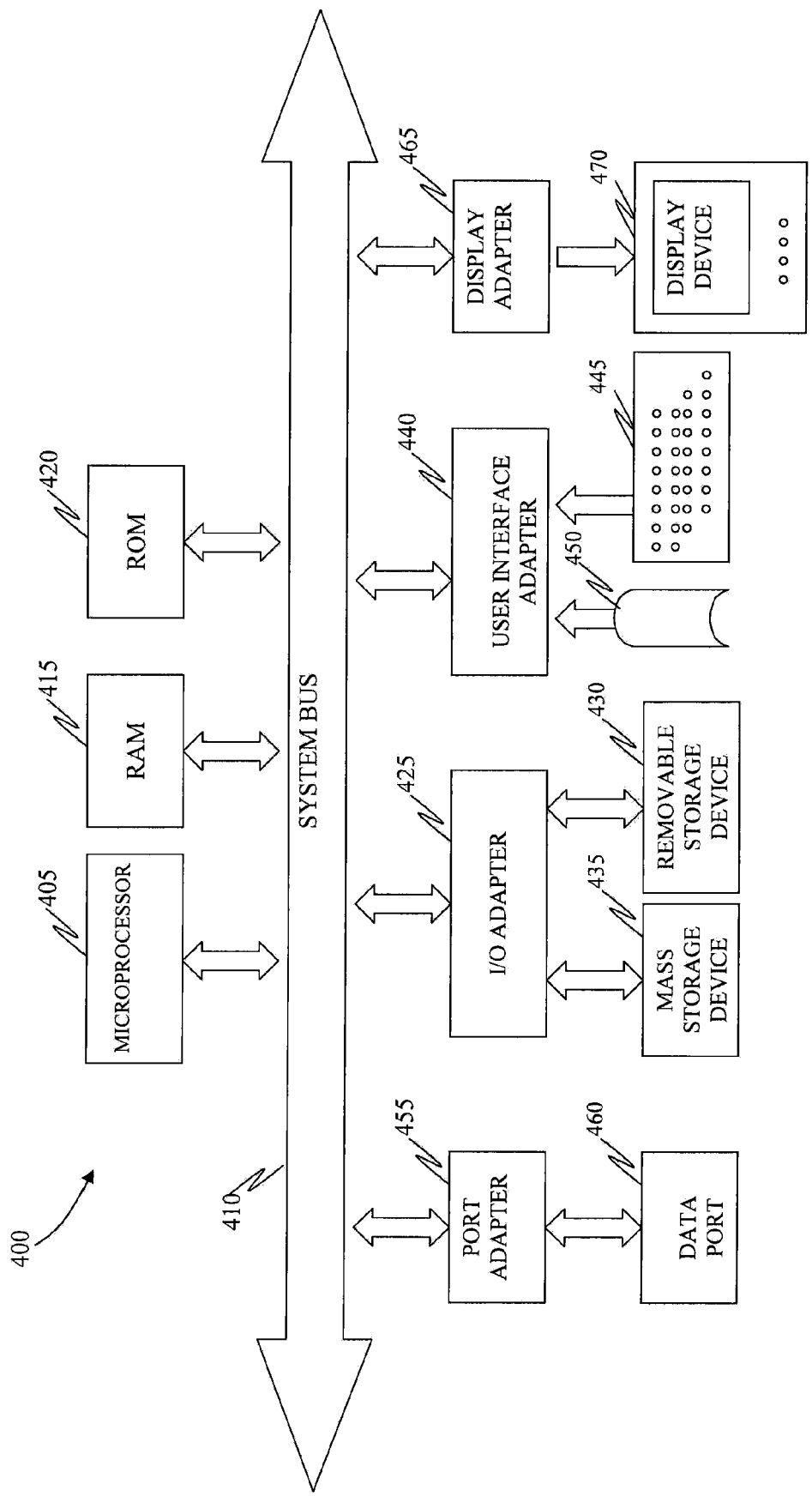
FIG. 2 is a schematic block diagram of a general-purpose computer suitable for practicing the present invention exemplary embodiments.

The capabilities of the present invention can be implemented in software, firmware, hardware or some combination thereof. As one example, the method of controlling a computer system having a central processor provided with a plurality of cores described herein is practiced with a general-purpose computer and the method may be coded as a set of instructions on removable or hard media for use by the general-purpose computer. FIG. 2 is a schematic block diagram of a general-purpose computer suitable for practicing the present invention embodiments. In FIG. 2, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of controlling a computer system having at least one processor including a plurality of cores, the method comprising:
   establishing a core max value, the core max value setting a maximum number of the plurality of cores operating at a predetermined time period based on an operating condition;
   determining a core run value, the core run value being associated with a number of the plurality of cores of the at least one processor operating at the predetermined time period;
   identifying at least one of the plurality of cores to stop in the event the core run value exceeds the core max value at the predetermined time period;
   transferring processes including a call stack, paging status, and memory access to memory from the at lease one of the plurality of cores prior to stopping the at least one of the plurality of cores;
   stopping the at least one of the plurality of cores, including stopping a process running at the at least one of the plurality of cores, in the event the core run value exceeds the core max value at the predetermined time period;
   re-determining the core run value including re-determining the number of the plurality of cores of the at least one processor currently operating;
   restarting the at least one of the plurality of stopped cores, including restarting the stopped process running at the at least one of the plurality of stopped cores, based on a priority level of the at least one of the plurality of stopped cores with respect to priority levels of other stopped cores if at least two cores have been stopped, in the event the core max value exceeds the re-determined core run value; and
   transferring processes including the call stack, the paging status, and the memory access from the memory to the restarted at least one of the plurality of cores.

2. The method of claim 1, further comprising:
sensing a temperature at the at least one processor; and
establishing the core max value based on the temperature at the at least one processor.

3. The method of claim 1, further comprising:
sensing a processing load for each of the plurality of cores; and
establishing the core max value based on the processing load.

4. The method of claim 1, further comprising:
detecting which of the plurality of cores are running low priority processes; and
stopping the core running the lowest priority process.

5. The method of claim 1, further comprising:
stopping additional ones of the plurality of cores until the core max value is greater than the core run value.

6. The method of claim 1, further comprising:
establishing a new core max value based on operating conditions at another predetermined time period; and
re-initiating the at least one of the plurality of cores if the core run value is equal to or greater than the new core max value.

7. A system for operating a computer system comprising:
at least one central processing unit (CPU) including a plurality of cores, the at least one CPU being interconnected functionally via a system bus to:
an input/output (I/O) adapter connecting to at least one of a removable data storage device, a program storage device, and a mass data storage device;

a user interface adapter connecting to one or more computer input devices; a display adapter connecting to a display device; and at least one memory device thereupon stored a set of instructions which, when executed by the at least one CPU, causes said system to:

establish a core max value, the core max value setting a maximum number of the plurality of cores operating at a predetermined time period based on an operating condition;

determine a core run value, the core run value being associated with a number of the plurality of cores operating at the predetermined time period;

identify at least one of the plurality of cores to stop in the event the core run value exceeds the core max value at the predetermined time period;

transfer processes including a call stack, paging status, and memory access to memory from the at lease one of the plurality of cores prior to stopping the at least one of the plurality of cores;

stop the at least one of the plurality of cores, including stopping a process running at the at least one of the plurality of cores, if the core run value exceeds the core max value at the predetermined time period;

re-determine the core run value including re-determining the number of the plurality of cores of the at least one processor currently operating;

restart the at least one of the plurality of stopped cores, including restarting the stopped process running at the at least one of the plurality of stopped cores, based on a priority level of the at least one of the plurality of stopped cores with respect to priority levels of other stopped cores if at least two cores have been stopped, in the event the core max value exceeds the re-determined core run value; and transfer processes including the call stack, the paging status, and the memory access from the memory to the restarted at least one of the plurality of cores.

8. The system of claim 7, wherein the set of instructions which, when executed by the at least one CPU, causes said system to:

sense a temperature at the at least one CPU; and
establish the core max value based on the temperature at the at least one CPU.

9. The system of claim 7, wherein the set of instructions which, when executed by the at least one CPU, causes said system to:

sense a processing load for each of the plurality of cores; and
establish the core max value based on the processing load.

10. The system of claim 7, wherein the set of instructions which, when executed by the at least one CPU, causes said system to:

detect which of the plurality of cores are running low priority processes; and
stop the core running the lowest priority process.

11. The system of claim 7, wherein the set of instructions which, when executed by the at least one CPU, causes said system to:

stop additional ones of the plurality of cores until the core max value is greater than the core run value.

12. The system of claim 7, wherein the set of instructions which, when executed by said CPU, causes said system to:

establish a new core max value based on operating conditions at another predetermined time period; and re-initiate the at least one of the plurality of cores if the core run value is equal to or greater than the new core max value.

13. A computer program product comprising:

a computer useable medium including a computer readable program, wherein the computer readable program when executed on a computer causes the computer to:

establish a core max value, the core max value setting a maximum number of a plurality of cores of at least one processor operating at a predetermined time period based on an operating condition;

determine a core run value, the core run value being associated with a number of the plurality of cores operating at the predetermined time period; and identify at least one of the plurality of cores to stop in the event the core run value exceeds the core max value at the predetermined time period;

transfer processes including a call stack, paging status, and memory access to memory from the at lease one of the plurality of cores prior to stopping the at least one of the plurality of cores;

stop the at least one of the plurality of cores, including stopping a process running at the at least one of the plurality of cores, if the core run value exceeds the core max value at the predetermined time period;

re-determine the core run value including re-determining the number of the plurality of cores of the at least one processor currently operating;

restart the at least one of the plurality of stopped cores, including restarting the stopped process running at the at least one of the plurality of stopped cores, based on a priority level of the at least one of the plurality of stopped cores with respect to priority levels of other stopped cores if at least two cores have been stopped, in the event the core max value exceeds the re-determined core run value; and transfer processes including the call stack, the paging status, and the memory access from the memory to the restarted at least one of the plurality of cores.

14. The computer program product of claim 13, wherein the computer readable program when executed on a computer causes the computer to:

sense a temperature at the at least one processor; and
establish the core max value based on the temperature at the at least one processor.

15. The computer program product of claim 13, wherein the computer readable program when executed on a computer causes the computer to:

sense a processing load for each of the plurality of cores; and
establish the core max value based on the processing load.

16. The computer program product of claim 13, wherein the computer readable program when executed on a computer causes the computer to:

detect which of the plurality of cores are running low priority processes; and
stop the core running the lowest priority process.

17. The computer program product of claim 13, wherein the computer readable program when executed on a computer causes the computer to:

stop additional ones of the plurality of cores until the core max value is greater than the core run value.

* * * * *